United States Patent
Wang et al.

(10) Patent No.: US 8,983,380 B2
(45) Date of Patent: Mar. 17, 2015

(54) ADAPTIVE TUNING METHOD AND APPARATUS FOR A COMBO WIRELESS SYSTEM

(75) Inventors: Chih Hsuan Wang, Hsinchu County (TW); Hao Sheng Hsu, Hsinchu County (TW)

(73) Assignee: Mediatek Inc., Hsinchu (TW)

( * ) Notice: Subject to any disclaimer, the term of this patent is extended or adjusted under 35 U.S.C. 154(b) by 280 days.

(21) Appl. No.: 12/718,223

(22) Filed: Mar. 5, 2010

(65) Prior Publication Data
US 2011/0105025 A1 May 5, 2011

Related U.S. Application Data

(60) Provisional application No. 61/255,878, filed on Oct. 29, 2009.

(51) Int. Cl.
*H04B 7/00* (2006.01)
*H04L 1/00* (2006.01)
*H04L 1/18* (2006.01)

(52) U.S. Cl.
CPC ............ *H04L 1/0019* (2013.01); *H04L 1/1825* (2013.01); *H04L 1/0003* (2013.01); *H04L 1/0009* (2013.01)

USPC ............ 455/41.2; 455/78; 370/345; 375/346

(58) Field of Classification Search
CPC ....................................... H04L 1/0019
USPC ...................... 455/41.2, 78; 370/345; 375/346
See application file for complete search history.

(56) References Cited

U.S. PATENT DOCUMENTS

| | | | |
|---|---|---|---|
| 2004/0192222 A1* | 9/2004 | Vaisanen et al. | 455/78 |
| 2006/0221926 A1* | 10/2006 | Maekawa et al. | 370/345 |
| 2007/0253339 A1 | 11/2007 | Ovadia et al. | |
| 2008/0192806 A1 | 8/2008 | Wyper et al. | |
| 2008/0238807 A1* | 10/2008 | Ibrahim et al. | 343/876 |
| 2009/0111405 A1 | 4/2009 | Huang et al. | |
| 2009/0135972 A1* | 5/2009 | Tanaka et al. | 375/346 |

* cited by examiner

*Primary Examiner* — Hsin-Chun Liao
(74) *Attorney, Agent, or Firm* — Hamre, Schumann, Mueller & Larson, P.C.

(57) ABSTRACT

An adaptive tuning method comprises the steps of: obtaining a statistical result; determining whether an adaptive tuning procedure is to be performed in accordance with the statistical result; obtaining reference information of the first wireless module; and performing the adaptive tuning procedure in accordance with the reference information.

15 Claims, 4 Drawing Sheets

ADAPTIVE TUNING METHOD AND APPARATUS FOR A COMBO WIRELESS SYSTEM

CROSS-REFERENCE TO RELATED APPLICATION

The application is an application under 35 USC 111(a) and claims priority under 35 USC §119 from Provisional Application Ser. No. 61/255,878, filed Oct. 29, 2009 under 35 USC §111(b), the disclosure of which is incorporated herein by reference.

BACKGROUND OF THE INVENTION

1. Field of the Invention

The present invention relates to a communication system, and more particularly, to an adaptive tuning method and apparatus for a combo wireless system.

2. Description of the Related Art

Wireless technology is widely used nowadays. A user can send or is receive data from a portable device, such as a mobile phone, a personal digital assistant (PDA) or a notebook computer, to another portable device or a stationary device via wireless communication. Different standards are established to govern these communications. IEEE 802.11 and Bluetooth (BT) are the most common standards used in portable devices. The IEEE 802.11 standard defines the transmission in a wireless local area network (WLAN), while Bluetooth is usually used for point-to-point transmission within a short distance. A new standard, Bluetooth 3.0 (BT 3.0), is also proposed for a combination device that integrates WLAN and Bluetooth transmission functions into a single device. The combination device is capable of transceiving signals through both WLAN and Bluetooth channels. However, in a wireless communication system comprising a combination transceiver, a WLAN transceiver and a Bluetooth transceiver, the transmission may be affected by interference. That is, if the WLAN transceiver and the Bluetooth transceiver are active at the same time, interference between the two signals will occur and thus degrade the transmission quality.

Therefore, an adaptive tuning method for a combination wireless communication system to prevent collisions between WLAN signals and Bluetooth signals is needed by the market.

SUMMARY OF THE INVENTION

An adaptive tuning method and apparatus for a combo wireless system are disclosed. One embodiment of the present invention discloses an adaptive tuning method for a combo wireless system comprising a first wireless module and a second wireless module. The adaptive tuning method comprises the steps of: obtaining a status of the second wireless module; determining whether an adaptive tuning procedure is to be performed in accordance with the status; obtaining reference information of is the first wireless module; and performing the adaptive tuning procedure in accordance with the reference information. The first wireless module can be a wireless fidelity (WiFi) module. The second wireless module can be a Bluetooth module, a worldwide interoperability for microwave access (WiMAX) module, a 3G module or an ultra-wideband (UWB) module. The above-mentioned reference information can be a received signal strength indication (RSSI) value, a bandwidth parameter, a packet error rate or the combination thereof.

Another embodiment of the invention discloses an adaptive tuning apparatus for a combo wireless system comprising a first wireless module and a second wireless module. The first wireless module can be a WiFi module. The second wireless module can be a Bluetooth module, a WiMAX module, a 3G module or a UWB module. The adaptive tuning apparatus comprises a detection unit, a determining unit, an acquiring unit and a tuning unit. The detection unit is utilized to detect a status of the second wireless module. The determining unit is utilized to determine whether to perform a tuning procedure according to the status of the second wireless module. The acquiring unit is utilized to obtain reference information of the first wireless module in accordance with a determination result of the determining unit. The reference information can be an RSSI value, a bandwidth parameter, a packet error rate or the combination thereof. The tuning unit is utilized to perform the tuning procedure in accordance with the reference information.

The foregoing has outlined rather broadly the features of the present disclosure in order that the detailed description of the disclosure that follows may be better understood. Additional features and advantages of the disclosure will be described hereinafter, which form the subject of the claims of the invention. It should be appreciated by those skilled in the art that the conception and specific embodiment disclosed may be readily utilized as a basis for modifying or designing other structures or processes is for carrying out the same purposes of the present disclosure. It should also be realized by those skilled in the art that such equivalent constructions do not depart from the spirit and scope of the invention as set forth in the appended claims.

BRIEF DESCRIPTION OF THE DRAWINGS

The accompanying drawings illustrate several embodiments of the invention and, together with the description, serve to explain the principles of the invention. Those skilled in the art will recognize that the particular embodiments illustrated in the drawings are merely exemplary, and are not intended to limit the scope of the present invention.

PREFERRED EMBODIMENT OF THE PRESENT INVENTION

One aspect of the present disclosure proposes an adaptive tuning method and apparatus for a combo wireless system. In order to provide a thorough understanding of the present disclosure, a detailed description of a number of method steps and components is provided below. Clearly, the practice of the present disclosure is not limited to any specific detail of a combo wireless system that is familiar to one skilled in the art. On the other hand, components or method steps which are well-known are not described in detail to avoid unnecessary limitations. A preferred embodiment of the present disclosure will be described in detail. However, in addition to the preferred embodiment described, other embodiments can be broadly employed, and the scope of the present disclosure is not limited by any of is the embodiments, but should be defined in accordance with the following claims and their equivalent.

Figure 1:
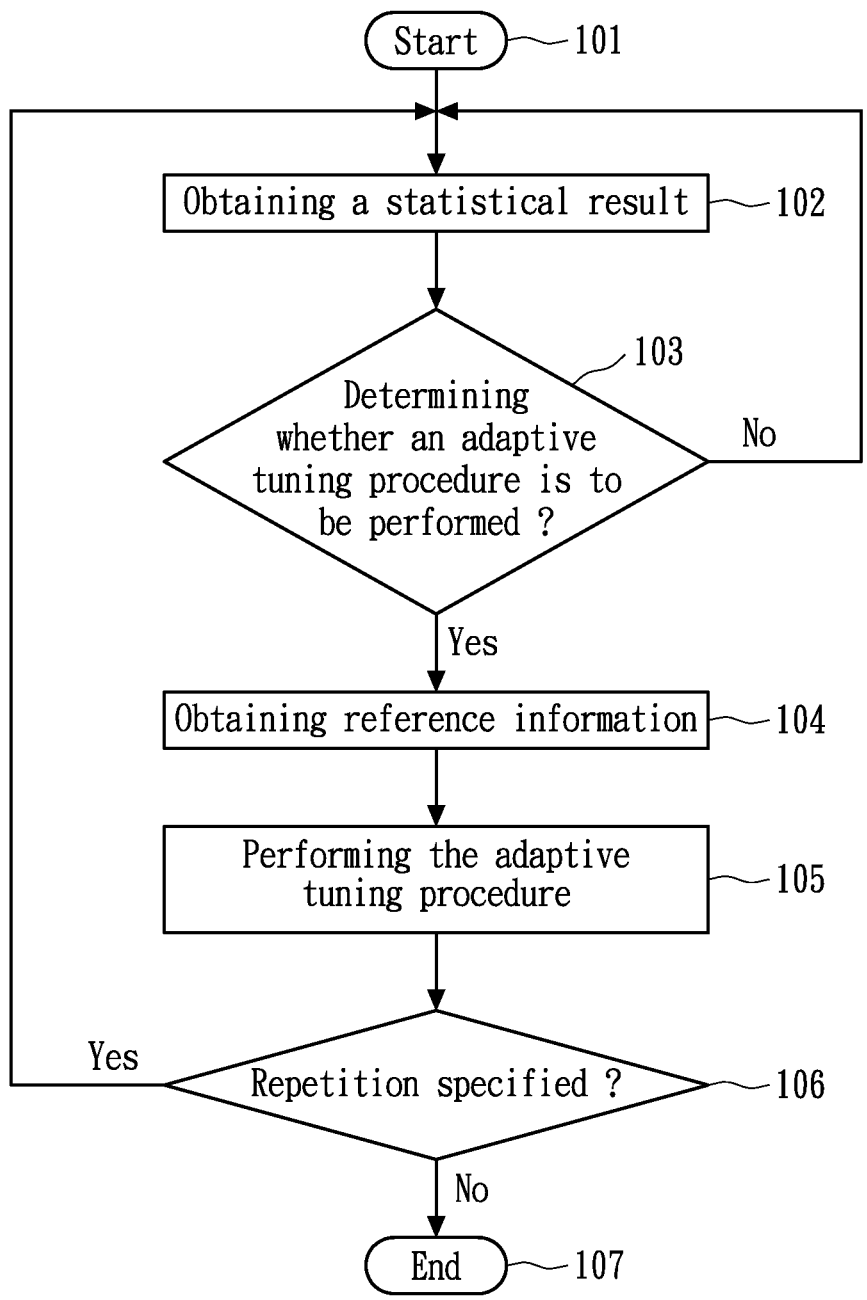
FIG. 1 shows a flowchart of an adaptive tuning method for a combo wireless system.

According to an exemplary embodiment of the present disclosure, an adaptive tuning method is disclosed for a combo wireless system comprising a first wireless module and a second wireless module. If a status of the second wireless module is active, an adaptive tuning procedure for the combo wireless system is to be performed. The status can be a statistic result that is obtained by counting a number of times the second wireless module transmits a notice signal to the first wireless module within a predetermined time. Reference information such as the statistical result, a received signal strength indication value, a packet error rate or the combination thereof can be used to determine the operation statuses to which the first wireless module and the second wireless module belong. Finally, the adaptive tuning procedure is performed for the first wireless module and the second wireless module in accordance with the reference information and the operation statuses of the first wireless module and the second module. In order to provide further detail, FIG. 1 shows a flowchart of an adaptive tuning method for a combo wireless system comprising a first wireless module and a second wireless module in accordance with an exemplary embodiment of the present disclosure. The first wireless module, for example, can be a wireless fidelity (WiFi) module. The second wireless module, for example, can be a Bluetooth (BT) module, a worldwide interoperability for microwave access (WiMAX) module, a 3G module or an ultra-wideband (UWB) module. However, the disclosure should not be limited to the embodiment. A communication method for the first wireless module and the second wireless module can be a 2-wire protocol, a 3-wire protocol or a 4-wire protocol.

Figure 2:
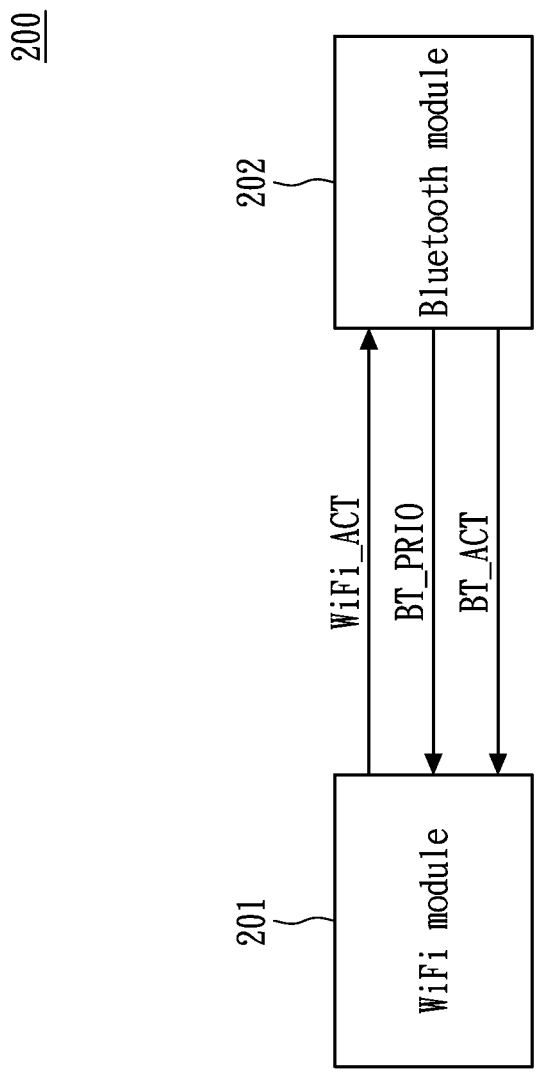
FIG. 2 shows a combo wireless system comprising a WiFi module and a BT module.

In accordance with an exemplary embodiment of the present disclosure, FIG. 2 shows a combo wireless system 200 comprising a WiFi module 201 and a BT module 202. A 2-wire protocol is used for the WiFi module and is the BT module to communicate with each other. According to the 2-wire protocol, the WiFi module sends a WiFi active (WiFi_ACT) signal to the BT module to indicate a transmission or receiving process being performed by the WiFi module. Similarly, the BT module also sends a Bluetooth active (BT_ACT) signal to the WiFi module to indicate a transmission or receiving process being performed by the BT module. The BT module additionally sends a Bluetooth priority (BT_PRIO) signal to the WiFi module if a transmission with high priority is to be performed. Such high priority transmission, for example, can be a voice transmission.

In order to enable those skilled in the art to practice the present invention in accordance with the exemplary embodiment of the present disclosure, FIGS. 1 and 2 are utilized to describe the procedure of the adaptive tuning method. In step 101, the procedure of the embodiment is activated. In step 102, a status of the BT module, such as a statistical result is obtained by counting a number of times that the BT module transmits a notice signal to the WiFi module within a predetermined time. The notice signal can be a BT_ACT signal or a BT_PRIO signal. In this exemplary embodiment, the notice signal is the BT_ACT signal. The predetermined time, for example, can be one second. Step 103 determines whether an adaptive tuning procedure is to be performed. The determination can be made by determining whether the statistical result is greater than a threshold value. The threshold value, for example, is a number of times that some event occurs within a predetermined time. In accordance with an exemplary embodiment of the present disclosure, if the number exceeds 50 times within 1 second, it is determined that the adaptive tuning procedure is to be performed. In step 104, reference information of the WiFi module is obtained. In accordance with an exemplary embodiment of the present disclosure, the reference information may be a RSSI value, a bandwidth parameter (for example, 40 MHz or 20 MHz), a packet error rate or the combination thereof. In step 105, the adaptive tuning procedure is performed.

Figure 3:
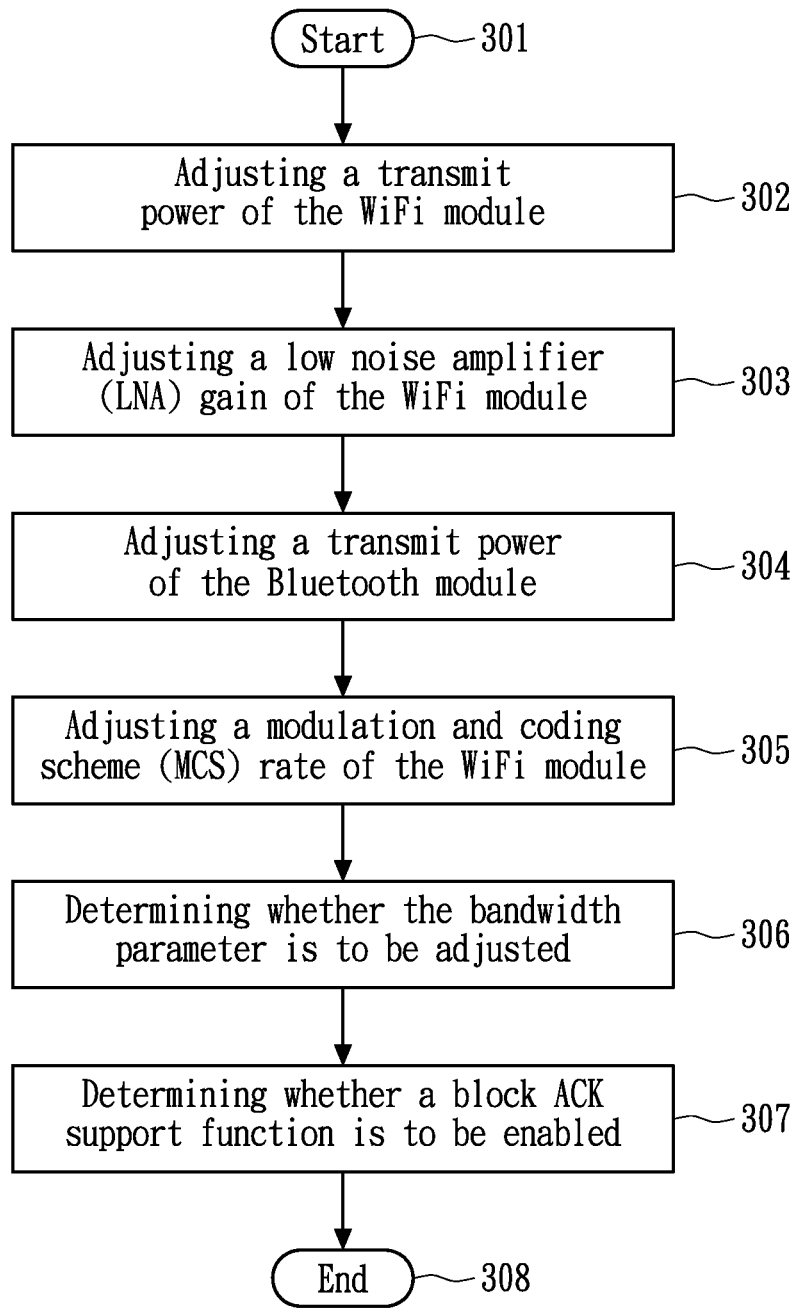
FIG. 3 shows a flowchart of an adaptive tuning procedure.

In accordance with an exemplary embodiment of the present disclosure, FIG. 3 shows a flowchart of the adaptive tuning procedure. In step 301, the adaptive tuning procedure is activated. In step 302, a transmit power of the WiFi module is adjusted in accordance with the RSSI value. In accordance with an exemplary embodiment of the present disclosure, the adjustment for the transmit power can be divided into five stages. For example, if the RSSI value is less than −80 dBm, the transmit power of the WiFi module may be reduced by 1 dBm. If the RSSI value between −80 dBm and −70 dBm is obtained, the transmit power of the WiFi module may be reduced by 3 dBm. If the RSSI value between −70 dBm and −60 dBm is obtained, the transmit power of the WiFi module may be reduced by 6 dBm. If the RSSI value between −60 dBm and −50 dBm is obtained, the transmit power of the WiFi module may be reduced by 7 dBm. If the RSSI value is greater than −50 dBm, the transmit power of the WiFi module may be reduced by 12 dBm. In step 303, a low noise amplifier (LNA) gain of the WiFi module is adjusted in accordance with the RSSI value. In accordance with an exemplary embodiment of the present disclosure, the adjustment for the LNA gain can be divided into 3 stages. If the RSSI value is less than −80 dBm, the LNA gain is set to high gain. If the RSSI value between −80 dBm and −35 dBm is obtained, the LNA gain is set to middle gain. If the RSSI value is greater than −50 dBm, the LNA gain is set to high gain. In step 304, a transmit power of the BT module is adjusted in accordance with the RSSI value. In accordance with an exemplary embodiment of the present disclosure, the adjustment for the transmit power can also be divided into five stages. In step 305, a modulation and coding scheme (MCS) rate of the WiFi module is adjusted in accordance with the RSSI value and the packet error rate. In accordance with an exemplary embodiment of the present disclosure, if the RSSI value is less than −80 dBm, the MCS rate is set to a fixed rate such as 11M/5.5M/2M in accordance with the packet error rate. Step 306 determines whether the bandwidth parameter is to be adjusted in accordance with the RSSI value. In accordance with an exemplary embodiment of the present disclosure, if the original bandwidth parameter is is set to 40 MHz and the RSSI value is less than −50 dBm, the bandwidth parameter is adjusted from 40 MHz to 20 MHz. If the original bandwidth parameter is set to 20 MHz and the RSSI value is greater than or equal to −50 dBm, the bandwidth parameter is adjusted from 20 MHz to 40 MHz. Step 307 determines whether a block ACK support function of the WiFi module is to be enabled in accordance with the RSSI value. In accordance with an exemplary embodiment of the present disclosure, if the RSSI value is less than −80 dBm, the block ACK support function is disabled. If the RSSI value is greater than or equal to −80 dBm, the block ACK support function is enabled. In step 308, the adaptive tuning procedure is ended. After performing the adaptive tuning procedure, step 106 determines whether steps 102-105 are to be repeated. If the answer is no, the procedure is ended in step 107. However, the disclosure should not be limited to the embodiment. According to another exemplary embodiment, the above-mentioned adaptive tuning procedure can include only a portion of the steps 302-307, or as few as one of the steps 302-307.

Figure 4:
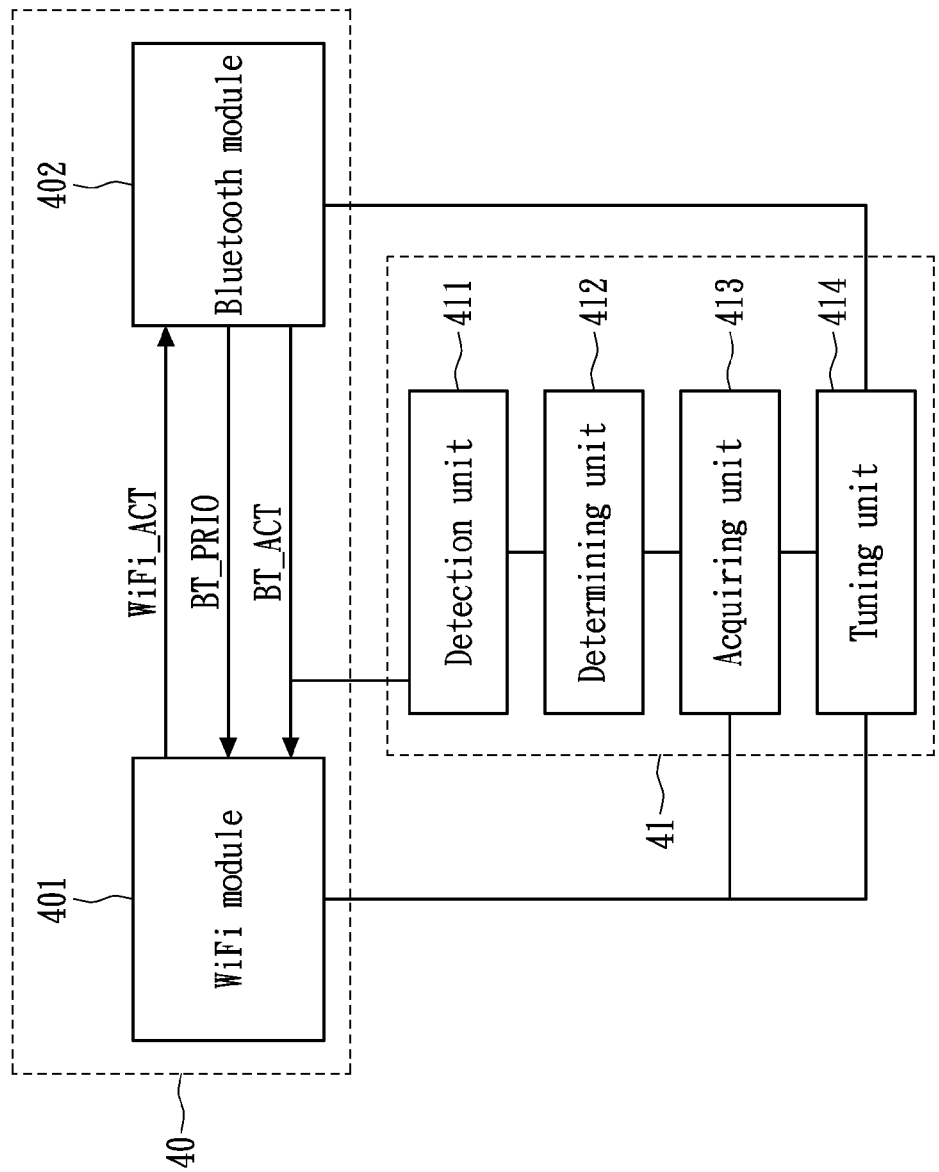
FIG. 4 shows a block diagram of an adaptive tuning apparatus used for a combo wireless system.

FIG. 4 shows a block diagram of an adaptive tuning apparatus 41 used for a combo wireless system 40 in accordance with another exemplary embodiment of the present disclosure. The combo wireless system 40 comprises a WiFi module 401 and a BT module 402. A 2-wire protocol is used for the WiFi module 401 and the BT module 402 to communicate with each other. According to the 2-wire protocol, the WiFi module sends a WiFi_ACT signal to the BT module to indicate that a transmission or receiving process is being performed by the WiFi module. Similarly, the BT module also sends a BT_ACT signal to the WiFi module to indicate that a transmission or receiving process is being performed by the BT module. The BT module additionally sends a BT_PRIO signal to the WiFi module if a transmission with high priority is to be performed. Such high priority transmission, for example, can be a voice transmission. Other than the 2-wire protocol, a 3-wire protocol or a 4-wire protocol can also be used for the WiFi module and the BT module to communicate with each other. In addition, a WiMAX module, a 3G module, or a UWB module can be used is to substitute the BT module. The adaptive tuning apparatus 41 comprises a detection unit 411, a determining unit 412, an acquiring unit 413 and a tuning unit 414. The detection unit 411 is configured to detect a number of times that the BT module 402 transmits a notice signal to the WiFi module 401 within a predetermined time, so as to obtain a statistical result. The notice signal can be a BT_ACT signal or a BT_PRIO signal. In this exemplary embodiment, the notice signal is the BT_ACT signal. The predetermined time, for example, can be one second. The determining unit 412 is configured to determine whether the statistical result is greater than a threshold value. The threshold value, for example, is a number of times that some events occur within a predetermined time. The acquiring unit 413 is configured to obtain reference information of the WiFi module 401 in accordance with a determination result of the determining unit 412. In accordance with an exemplary embodiment of the present disclosure, the reference information is an RSSI value, a bandwidth parameter, a packet error rate or the combination thereof. The tuning unit 414 is configured to perform an adaptive tuning procedure in accordance with the reference information. In accordance with an exemplary embodiment of the present disclosure, the adaptive tuning procedure comprises: adjusting a transmit power of the WiFi module in accordance with the RSSI value; adjusting an LNA gain of the WiFi module in accordance with the RSSI value; adjusting a transmit power of the BT module in accordance with the RSSI value; adjusting a MCS rate of the WiFi module in accordance with the RSSI value and the packet error rate; determining whether the bandwidth parameter is to be adjusted in accordance with the RSSI value and the current bandwidth; and determining whether a block ACK support function of the WiFi module is to be enabled in accordance with the RSSI value and the current bandwidth. The adaptive tuning apparatus 41 can be implemented with software, firmware, hardware, or a platform with a single processor or with multiple processors.

The above-described embodiments of the present disclosure are intended to be illustrative only. Numerous alternative embodiments may be devised by persons skilled in the art without departing from the scope of the following claims.

What is claimed is:

1. An adaptive tuning method for a combo wireless system comprising a first wireless module and a second wireless module, the method comprising the steps of:
obtaining a status of the second wireless module, wherein the status is a statistic result that is obtained by counting a number of times the second wireless module's transmitting a signal to the first wireless module within a predetermined time;
obtaining reference information of the first wireless module when the status of the second wireless module is larger than a threshold value; and
adaptively tuning the first wireless module or the second wireless module in accordance with the reference information.

2. The method of claim 1, wherein the reference information is a received signal strength indication (RSSI) value, a bandwidth parameter, a packet error rate or the combination thereof.

3. The method of claim 2, wherein the adaptively tuning the first wireless module or the second wireless module in accordance with the reference information step comprises at least one of the following steps; adjusting a transmit power of the first wireless module in accordance with the RSSI value;
adjusting a low noise amplifier (LNA) gain of the first wireless module in accordance with the RSSI value;
adjusting a transmit power of the second wireless module in accordance with the RSSI value;
adjusting a modulation and coding scheme (MCS) rate of the first wireless module in accordance with the RSSI value and the packet error rate;
determining whether the bandwidth parameter is to be adjusted in accordance with the RSSI value; or
determining whether a block acknowledge support function is to be enabled for the first wireless module in accordance with the RSSI value.

4. The method of claim 1, wherein the signal is a Bluetooth active (BT_ACT) signal or a Bluetooth priority (BT_PRIO) signal.

5. The method of claim 1, wherein the first wireless module is a wireless fidelity (WiFi) module.

6. The method of claim 1, wherein the second wireless module is a Bluetooth module, a worldwide interoperability for microwave access is (WiMAX) module, a 3G module or an ultra-wideband (UWB) module.

7. The method of claim 1, wherein a communication method for the first wireless module and the second wireless module is a 2-wire protocol, a 3-wire protocol or a 4-wire protocol.

8. A tuning apparatus for a combo wireless system comprising a first wireless module and a second wireless module, the apparatus comprising:
a detection unit configured to detect a status of the second wireless module, wherein the status is a statistic result that is obtained by counting the number of times the second wireless module's transmitting a signal to the first wireless module within a predetermined time;
a determining unit configured to determine whether the status of the second wireless module is larger than a threshold value;
an acquiring unit configured to obtain reference information of the first wireless module when the status of the second wireless module is larger than the threshold value; and
a tuning unit configured to perform a tuning procedure in accordance with the reference information, wherein the tuning procedure comprises adaptively tuning the first wireless module or the second wireless module.

9. The tuning apparatus of claim 8, wherein the reference information is a received signal strength indication (RSSI) value, a bandwidth parameter, a packet error rate or the combination thereof.

10. The tuning apparatus of claim 9, wherein the tuning procedure comprises at least one of the following steps:
- adjusting a transmit power of the first wireless module in accordance with the RSSI value;
- adjusting a low noise amplifier (LNA) gain of the first wireless module in accordance with the RSSI value;
- adjusting a transmit power of the second wireless module in accordance with the RSSI value;
- adjusting a modulation and coding scheme (MCS) rate of the first wireless module in accordance with the RSSI value and the packet error rate;
- determining whether the bandwidth parameter is to be adjusted in accordance with the RSSI value; or
- determining whether a block ACK support function of the first wireless module is to be enabled in accordance with the RSSI value.

11. The tuning apparatus of claim 8, wherein the signal is a Bluetooth active (BT_ACT) signal or a Bluetooth priority (BT_PRIO) signal.

12. The tuning apparatus of claim 8, wherein the first wireless module is a wireless fidelity (WiFi) module.

13. The tuning apparatus of claim 8, wherein the second wireless module is a Bluetooth module, a worldwide interoperability for microwave access (WiMAX) module, a 3G module or an ultra-wideband (UWB) module.

14. The tuning apparatus of claim 8, wherein a communication method for the first wireless module and the second wireless module is a 2-wire protocol, a 3-wire protocol or a 4-wire protocol.

15. The tuning apparatus of claim 8, which is implemented with software, firmware, hardware, or a platform with a single processor or with multiple processors.

\* \* \* \* \*